United States Patent [19]
Ohta

[11] Patent Number: 4,942,465
[45] Date of Patent: Jul. 17, 1990

[54] METHOD OF CODING A DIGITAL VIDEO SIGNAL FOR REVERSE REPRODUCTION OF PICTURES

[75] Inventor: Mutsumi Ohta, Tokyo, Japan
[73] Assignee: NEC Corporation, Japan
[21] Appl. No.: 358,951
[22] Filed: May 30, 1989
[30] Foreign Application Priority Data
  May 30, 1988 [JP] Japan .................. 63-133477
[51] Int. Cl.$^5$ ........................... H04N 7/137
[52] U.S. Cl. .................... 358/133; 358/135; 358/136
[58] Field of Search ........................ 358/133, 135, 136

[56] References Cited
U.S. PATENT DOCUMENTS
  4,734,767  3/1988  Kaneko ................. 358/135
  4,837,618  6/1989  Hatori .................. 358/136

Primary Examiner—Howard W. Britton
Attorney, Agent, or Firm—Ostrolenk, Faber, Gerb & Soffen

[57] ABSTRACT

On subjecting a digital video signal of successive pictures to redundancy reduction coding, a mode signal is produced which indicates, as the redundancy reduction coding, a selected one of interframe coding and intraframe coding. The digital video signal is selectively subjected to the selected one of the interframe and the intraframe coding in response to the mode signal. A particular picture element of a current picture is subjected to the intraframe coding when the mode signal indicates that the particular picture element should be subjected to the interframe coding and that a corresponding picture element of a following picture following the current picture should be subjected to the intraframe coding. The mode signal and results of the interframe and the intraframe coding are multiplexed into a multiplexed signal. When a motion-compensated coding is used instead of the interframe coding, a specific picture element of the current picture is subjected to the intraframe coding when the mode signal indicates that the specific picture element should be subjected to the motion-compensated coding and furthermore when the specific picture element has no relation to a movement represented by each of motion vectors which are used in carrying out the interframe coding on the picture elements of the following picture.

4 Claims, 16 Drawing Sheets

|  | 0-th FRAME | 1st FRAME | 2nd FRAME | 3rd FRAME | 4th FRAME |
|---|---|---|---|---|---|
| 1st PICTURE ELEMENT | P(0,1) | E(1,1) | P(2,1) | E(3,1) | E(4,1) |
| 2nd PICTURE ELEMENT | P(0,2) | E(1,2) | E(2,2) | E(3,2) | E(4,2) |
| 3rd PICTURE ELEMENT | P(0,3) | E(1,3) | E(2,3) | P(3,3) | E(4,3) |
| 4th PICTURE ELEMENT | P(0,4) | E(1,4) | E(2,4) | E(3,4) | E(4,4) |

NORMAL REPRODUCTION (frames 1–4)

FIG. 2

|  | 0-th FRAME | 1st FRAME | 2nd FRAME | 3rd FRAME | 4th FRAME |
|---|---|---|---|---|---|
| 1st PICTURE ELEMENT | E(1,1) | P(1,1) | E(3,1) | E(4,1) | P(4,1) |
| 2nd PICTURE ELEMENT | E(1,2) | E(2,2) | E(3,2) | E(4,2) | P(4,2) |
| 3rd PICTURE ELEMENT | E(1,3) | E(2,3) | P(2,3) | E(4,3) | P(4,3) |
| 4th PICTURE ELEMENT | E(1,4) | E(2,4) | E(3,4) | E(4,4) | P(4,4) |

REVERSE REPRODUCTION (frames 1–4)

FIG. 3

|  | zeroth FRAME | 1st FRAME | 2nd FRAME | 3rd FRAME | 4th FRAME |
|---|---|---|---|---|---|
| 1st PICTURE ELEMENT | P(0,1) | P(1,1)* | P(2,1) |  | P(4,1)* |
| 2nd PICTURE ELEMENT | P(0,2) |  |  |  | P(4,2)* |
| INTERFRAME CODING 3rd PICTURE ELEMENT | P(0,3) |  | P(2,3)* | P(3,3) | P(4,3)* |
| 4th PICTURE ELEMENT | P(0,4) |  |  |  | P(4,4)* |
| 1st PICTURE ELEMENT |  | E(1,1) |  | E(3,1) | E(4,1) |
| 2nd PICTURE ELEMENT |  | E(1,2) | E(2,2) |  | E(4,2) |
| INTERFRAME CODING 3rd PICTURE ELEMENT |  | E(1,3) | E(2,3) | E(3,3) | E(4,3) |
| 4th PICTURE ELEMENT |  | E(1,4) | E(2,4) | E(3,4) | E(4,4) |

FIG. 4

NORMAL REPRODUCTION

|  | 0-th FRAME | 1st FRAME | 2nd FRAME | 3rd FRAME | 4th FRAME |
|---|---|---|---|---|---|
| 1st PICTURE ELEMENT | P(0,1) | E(1,1) V(1,1) | E(2,1) V(2,1) | E(3,1) V(3,1) | E(4,1) V(4,1) |
| 2nd PICTURE ELEMENT | P(0,2) | E(1,2) V(1,2) | E(2,2) V(2,2) | E(3,2) V(3,2) | E(4,2) V(4,2) |
| 3rd PICTURE ELEMENT | P(0,3) | E(1,3) V(1,3) | E(2,3) V(2,3) | E(3,3) V(3,3) | E(4,3) V(4,3) |
| 4th PICTURE ELEMENT | P(0,4) | E(1,4) V(1,4) | P(2,4) | E(3,4) V(3,4) | E(4,3) V(4,3) |

FIG.6

|  | 0-th FRAME | 1st FRAME | 2nd FRAME | 3rd FRAME | 4th FRAME |
|---|---|---|---|---|---|
| 1st PICTURE ELEMENT | E(1,1) V(1,1) | P(1,1) | P(2,1) | E(4,1) V(4,1) | P(4,1) |
| 2nd PICTURE ELEMENT | E(1,2) V(1,2) | E(2,1) V(2,1) | E(3,1) V(3,1) | E(4,2) V(4,2) | P(4,2) |
| 3rd PICTURE ELEMENT | E(1,3) V(1,3) | E(2,2) V(2,2) | E(3,2) V(3,2) | E(4,3) V(4,3) | P(4,3) |
| 4th PICTURE ELEMENT | E(1,4) V(1,4) | E(2,3) V(2,3) | E(3,4) V(3,4) | E(4,4) V(4,4) | P(4,4) |

REVERSE REPRODUCTION

FIG.7

METHOD OF CODING A DIGITAL VIDEO SIGNAL FOR REVERSE REPRODUCTION OF PICTURES

BACKGROUND OF THE INVENTION

This invention relates to a coding method of coding a digital video signal by subjecting the digital video signal to redundancy reduction coding. This invention relates also to a coding device for use in carrying out the method.

Each of the successive pictures is called a frame when the digital video signal is, for example, a television signal. Redundancy reduction coding is effective to code the digital video signal into a coded video signal having a low bit rate. As the redundancy reduction coding, basic interframe predictive coding is known in the art. The basic interframe predictive coding makes use of a correlation factor between adjacent ones of the pictures or frames. In the basic interframe predictive coding, the redundancy reduction coding is carried out on a difference between corresponding picture elements of two successive pictures to provide a result of the basic interframe predictive coding.

Motion-compensated interframe predictive coding is also known in the art as the redundancy reduction coding. In the motion-compensated interframe predictive coding, a motion vector is detected which represents a movement of each picture element between two of pictures. The motion-compensated interframe predictive coding carries out interframe predictive coding of the digital video signal by using the motion vector.

Inasmuch as the motion-compensated interframe predictive coding is also carried out by using a correlation factor between two adjacent pictures like the basic interframe predictive coding, not only the basic interframe predictive coding but also the motion-compensated interframe predictive coding will be referred to as interframe coding.

Intraframe or inframe coding is still also known in the art as the redundancy reduction coding. The intraframe coding is carried out by using a correlation factor between the picture elements within each of the pictures. The intraframe coding is, for example, PCM (pulse code modulation) coding, intraframe predictive coding, orthogonal transformation coding, or vector quantization coding.

Such redundancy reduction coding is generally used in transmitting the digital video signal. However, the redundancy reduction coding is also used in a video signal processing system which is for use in a recording medium, such as a compact disk read-only memory (CD-ROM), to record and/or reproduce the digital video signal.

In the meanwhile, it may be preferable that the compact disk read-only memory can be operable like a video tape in performing not only a normal reproduction but also various other functions, such as a reverse reproduction, a high speed reproduction, scene skipping, an arbitrary reproduction of an arbitrary scene. However, it is difficult to perform the reverse reproduction when the digital video signal is subjected to the interframe coding alone. More specifically, the digital video signal is divided into a zeroth or leading frame to an end or trailing frame as leading through trailing compressed video signals subjected to the interframe coding. The digital video signal is successively recorded on the recording medium from the leading compressed video signal to the trailing compressed video signal in a normal order. Merely for convenience of description, the zeroth through the end frames may be understood to correspond to zeroth through end scenes, respectively. On carrying out the reverse reproduction, the digital video signal is reproduced from the recording medium in a reverse order from the end scene in response to a request issued by an operator or user to indicate the reverse reproduction.

In order to perform the reverse reproduction, an improved method is disclosed in a prior U.S. patent application Ser. No. 189,249 which was filed May 2, 1988, by Toshio Koga, Junichi Ohki, Mutsumi Ohta, and Hideto Kunihiro for assignment to the present assignee and c/o NEC Home Electronics, Ltd. The above-named Mutsumi Ohta is the instant applicant. The Ohta et al patent application corresponds to a prior Canadian patent application No. 565,485 which was filed Apr. 29, 1988. In the prior patent applications, the video signal processing system is called an image processing system. The digital video signal is called a sequence of image signals. In the improved method, the digital video signal is coded with the leading and the trailing frames subjected to the intraframe predictive coding and with the remaining frames subjected to the interframe predictive coding. According to the improved method, it is possible to carry out not only the normal reproduction but also the reverse reproduction. The improved method is, however, defective in that the reverse reproduction can not be performed when an interframe/intraframe adaptive coding is used as the redundancy reduction coding. In the interframe/intraframe adaptive predictive coding, the digital video signal is decoded into a decoded signal with a first result of the interframe coding and a second result of the intraframe coding alternatingly appearing in the coded signal. More specifically, the interframe coding and the intraframe coding are adaptively alternatingly carried out in consideration of an amount of produced information of the first result and another amount of produced information of the second result.

SUMMARY OF THE INVENTION

It is therefore a general object of this invention to provide a method of coding a digital video signal, whereby reverse reproduction can be performed when interframe/intraframe adaptive coding is used in coding the digital video signal.

Other objects of this invention will become clear as the description proceeds.

A method to which this invention is applicable is for coding a digital video signal by subjecting the digital video signal to redundancy reduction coding. The digital video signal is representative of successive pictures, each comprising a predetermined number of picture elements. According to an aspect of this invention, the method comprises the steps of (a) producing a coding mode signal which indicates, as the redundancy reduction coding, a selected one of interframe coding and intraframe coding which are carried out with reference to a first correlation factor between adjacent ones of the successive pictures and a second correlation factor between the picture elements within each of the successive pictures, respectively, (b) selectively coding said digital video signal into a first coded signal by carrying out the selected one of the interframe and the intraframe coding in response to the coding mode signal, the first coded signal carrying a first result of the interframe coding and a second result of the intraframe coding, (c) making the selectively coding step carry out the intraframe coding on a particular element of the picture elements of a current picture to produce a second coded signal when the coding mode signal indicates that the particular element should be subjected to the interframe coding and that a corresponding element of a following picture should be subjected to the intraframe coding, the following picture following the current picture in the successive pictures, the corresponding element corresponds to the particular element, and (d) multiplexing the first, and the second coded signals and the coding mode signal into a multiplexed signal.

According to another aspect of this invention, the method comprising the steps of (a) producing a coding mode signal which indicates, as the redundancy reduction coding, a selected one of interframe coding and intraframe coding, the interframe coding being carried out by detecting a motion vector representative of a movement of each picture element between adjacent ones of the successive pictures and by using said motion vector, the intraframe coding being carried out by using a correlation between the picture elements within each of the successive pictures, (b) selectively coding the digital video signal into a first coded signal by carrying out the selected one of the interframe and the intraframe coding in response to the coding mode signal, the first coded signal carrying a first result of the interframe coding and a second result of the intraframe coding, (c) making the selectively coding step carry out the intraframe coding on a specific element of the picture elements of a current picture to produce a second coded signal when the coding mode signal indicates that the specific element should be subjected to the interframe coding and furthermore when the specific element has no relation to the movement represented by each of the motion vectors which are used in carrying out the interframe coding on the picture elements of a following frame when the coding mode signal indicates that the picture elements of the following frame should be subjected to the interframe coding, the following picture following the current picture in the successive pictures, and (d) multiplexing the first and the second coded signals, the motion vectors, and the coding mode signal into a multiplexed signal.

BRIEF DESCRIPTION OF THE DRAWING

FIG. 2 is another diagram for use in describing the coding method according to the first embodiment of this invention;

FIG. 3 is still another diagram for use in describing the coding method according to the first embodiment of this invention;

FIG. 4 is yet another diagram for use in describing the coding method according to the first embodiment of this invention;

FIG. 6 is another diagram for use in describing the coding method according to the second embodiment of this invention;

FIG. 7 is still another diagram for use in describing the coding method according to the second embodiment of this invention;

DESCRIPTION OF THE PREFERRED EMBODIMENTS

Figure 1:
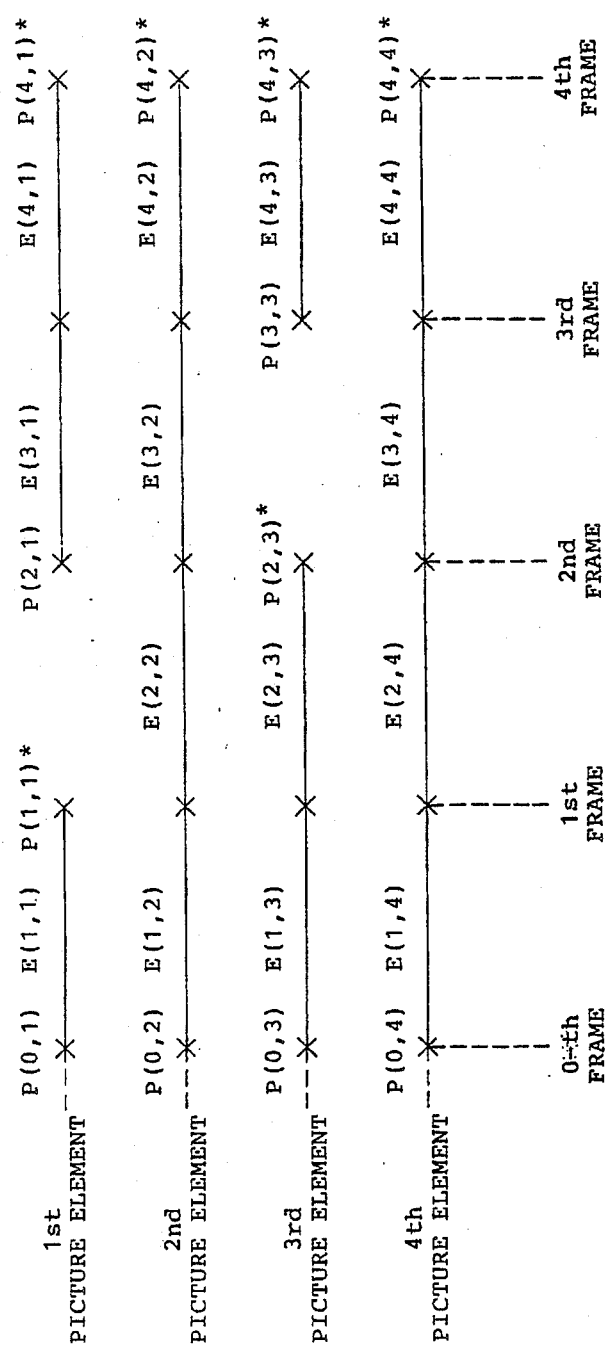
FIG. 1 is a diagram for use in describing a coding method according to a first embodiment of this invention.

Referring to FIG. 1, description will now be made as regards a coding method according to a first embodiment of this invention. Attention will be directed at first to a basic interframe predictive coding method. It will be assumed that a (j, k)-th picture element of an i-th frame of a digital video signal is represented by $X(i, j, k)$, where i is equal to one of integers $0, \ldots,$ and n. Likewise, j is equal to one of integers $1, \ldots,$ and p while k is equal to one of integers $1, \ldots,$ and q. Further supposing that an interframe predictive error signal (namely, an interframe difference signal) is represented by $E(i, j, k)$, the interframe predictive error signal $E(i, j, k)$ is represented by Formula (1) hereunder:

$$E(i, j, k) = X(i, j, k) - X(i-1, j, k). \qquad (1)$$

In the basic interframe predictive coding method, the interframe predictive error signal $E(i, j, K)$ is calculated at first. The interframe predictive error signal $E(i, j, k)$ is subsequently coded into a coded predictive error signal. In order to carry out a normal reproduction of the picture element $X(i, j, k)$ by decoding the coded predictive error signal in a decoder, the picture element $X(i, j, k)$ is obtained by Formula (2) hereunder which is given by modification of Formula (1):

$$X(i, j, k) = E(i, j, k) + X(i-1, j, k). \qquad (2)$$

It should be noted here that picture elements x(0, j, k) of the zeroth frame or picture are given to the decoder in order to carry out the normal reproduction by using Formula (2). In general, first and second method are used in order to supply the decoder with the picture elements X(0, j, k) of the zeroth picture. In the first method, the picture elements X(0, j, k) of the zeroth picture are coded by intraframe coding described in the preamble of the instant specification. In the prior patent application described in the preamble of the instant specification, the picture elements X(0, j, k) of the zeroth picture are coded by using an intraframe predictive coding as the intraframe coding. In the second method, the zeroth picture is preliminarily determined to have a fixed picture.

Description will proceed to a reverse reproduction. In order to carry out the reverse reproduction of the picture elements X(i, j, k), the picture elements X(i, j, k) are successively decoded by the decoder from the n-th frame to the zeroth frame by Formula (3) hereunder which is given by different modification of Formula (1):

$$X(i-1, j, k) = -E(i, j, k) + X(i, j, k). \quad (3)$$

In this case, picture elements X(n, j, k) of the n-th or trailing picture should be obtained by the decoder. In order to carry out the reverse reproduction, the picture elements X(n, j, k) of the n-th picture are also coded by the intraframe coding. In the prior patent application described in the preamble of the instant specification, the picture elements X(n, j, k) of the n-th picture are coded by using the intraframe predictive coding as the intraframe coding.

Thus, the digital video signal is coded in the prior patent application with the zeroth and the n-th pictures subjected to intraframe predictive coding and with the remaining pictures subjected to intraframe predictive coding. However, the reverse reproduction can not be performed according to the prior patent application when interframe/intraframe adaptive coding is used as redundancy reduction coding. This incapability of the reverse reproduction will be described hereunder.

In FIG. 1, it will be assumed that each frame of the digital video signal is represented by a one-dimensional signal merely for convenience of the description although each frame cf the digital video signal is a two-dimensional signal in fact. In FIG. 1, an interframe predictive error signal of a j-th picture element of an i-th frame is represented by E(i, j). The interframe predictive error signal E(i, j) is equivalent to a first result of interframe predictive coding when the j-th picture element of the i-th frame is subjected to the interframe predictive coding. An intraframe coded signal of the j-th picture element of the i-th frame is represented by P(i, j). The intraframe coded signal P(i, j) is equivalent to a second result of intraframe coding when the j-th picture element of the i-th frame is subjected to the intraframe coding.

In order to perform the normal reproduction, all of the picture elements of the zeroth frame are subjected to the intraframe predictive coding to produce second results P(0, 1), P(0, 2), P(0, 3), and P(0, 4). All of the picture elements of the first frame are subjected to the basic interframe predictive coding to produce first results E(1, 1), E(1, 2), E(1, 3), and E(1, 4).

A first picture element of the second frame is subjected to the basic intraframe predictive coding to produce a second result P(2, 1). Second through fourth picture elements of the second frame are subjected to the basic interframe predictive coding to produce first results E(2, 2), E(2, 3), and E(2, 4).

For the third frame, first, second, and fourth picture elements are subjected to the basic interframe predictive coding to produce first results E(3, 1), E(3, 2), and E(3, 4). A third picture element of the third frame is subjected to the intraframe predictive coding to produce a second result P(3, 3). For the fourth frame, first through fourth picture elements are subjected to the basic interframe predictive coding to produce first results E(4, 1), E(4, 2), E(4, 3), and E(4, 4).

It will be assumed merely for brevity of the description that the fourth frame is the trailing frame. In order to perform the reverse reproduction, all of the Picture elements of the fourth frame are subjected to the intraframe coding to produce second results P(4, 1), P(4, 2), P(4, 3), and P(4, 4).

Turning to FIG. 2, the first and the second results E and P are represented for use in carrying out the normal reproduction.

Turning back to FIG. 1, it is impossible to decode the first picture element of the first frame and the third picture element of the second frame when the reverse reproduction is carried out in accordance with Formula (3). This is because the first results E(2, 1) and E(3, 3) are not produced.

In order to resolve this problem, the first picture element of the first frame and the third picture element of the second frame are subjected to the intraframe coding to produce second results P(1, 1) and P(2, 3) in accordance with this invention. In FIG. 1, a symbol * is attached to the right upper portion of each of the second results P(1, 1), P(2, 3), P(4, 1), P(4, 2), P(4, 3), and P(4, 4) which are used in carrying out the reverse reproduction and are not used in carrying out the normal reproduction.

Turning to FIG. 3, the first and the second results E and P are represented for use in carrying out the reverse reproduction. Turning to FIG. 4, the first and the second results E and P are represented for use in carrying out not only the normal reproduction but also the reverse reproduction.

Turning back to FIG. 1 again, a method according to the first embodiment of this invention will be described more in detail. The method is for coding a digital video signal by subjecting the digital video signal to redundancy reduction coding. The digital video signal is representative of successive pictures, each of which comprises a predetermined number of picture elements.

It will be assumed for a short while that the interframe/intraframe adaptive coding is used in coding the digital video signal. According to the embodiment being described, the method comprises a producing step wherein a coding mode signal is produced which indicates, as the redundancy reduction coding, a selected one of the basic interframe predictive coding and the intraframe coding.

In a selectively coding step, the digital video signal is selectively coded into a first coded signal by carrying out the selected one of the basic interframe predictive coding and the intraframe coding in response to the coding mode signal. The first coded signal carries a first result E of the basic interframe predictive coding and a second result P of the intraframe coding.

The selectively coding step is made to carry out the intraframe predictive coding on a particular element (for example, the first picture element of the first frame)

of the picture elements of a current picture (that is, the first frame) to produce a second coded signal P(1, 1) when the coding mode signal indicates that the particular element should be subjected to the basic interframe predictive coding and that a corresponding element (that is, the first picture element of the second frame) of a following picture (that is, the second frame) should be subjected to the intraframe coding. The following picture follows the current picture in the successive pictures. The corresponding element corresponds to the particular element.

In due course, a second frame or picture becomes the current picture. At this stage of coding, the particular element corresponds to the third picture element of the second frame while the corresponding picture of the following picture corresponds to the third picture element of the third frame. In this event, the selectively coding step produces the second coded signal P(2, 3).

The first and the second coded signals and the coding mode signal are multiplexed into a multiplexed signal.

Description will be made as regards a feature of the method. It will be assumed that S(i, j) represents the coding mode signal of the j-th picture element of the i-th frame. When the coding mode signal S(i, j) represents the intraframe coding, the first result E(i, j) of the basic interframe predictive coding is not produced. Inasmuch as the first result E(i, j) is not produced, it is impossible to carry out the reverse reproduction of the j-th picture element of the (i−1)-th frame. In order to realize the reverse reproduction of the j-th picture element of the (i−1)-th frame, the intraframe coding is carried out on the j-th picture element of the (i−1)-th frame to produce the second result P(i−1, j). That is, not only the basic interframe predictive coding but also the intraframe coding are carried out on the j-th picture element of the (i−1)-th frame.

Figure 5:
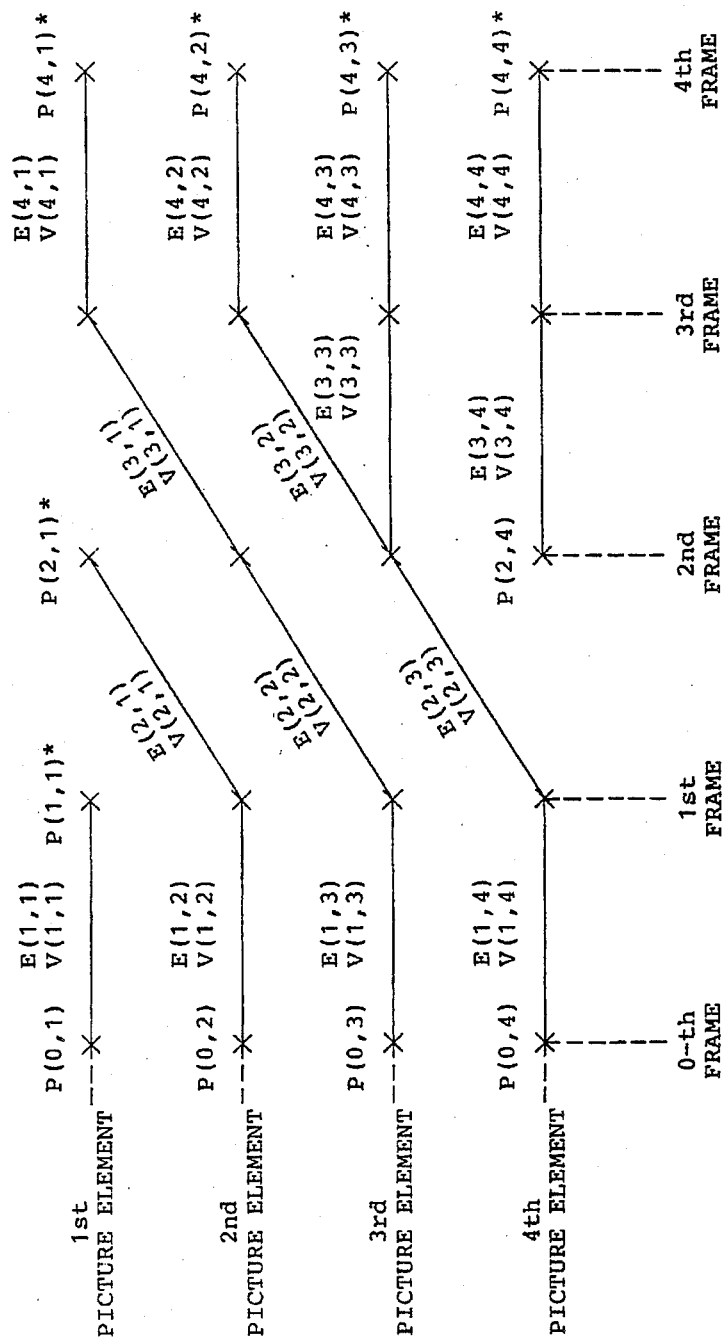
FIG. 5 is a diagram for use in describing a coding method according to a second embodiment of this invention.

Referring to FIG. 5, description will proceed to a coding method according to a second embodiment of this invention. Attention will be directed to a motion compensated interframe predictive coding method. It will be assumed that a motion vector of the picture element X(i, j, k) is represented by V(i, j, k) and that the motion vector V(i, j, k) is represented by:

V(i, j, k) = (vx(i, j, k), vy(i, j, k)), where vx(i, j, k) and vy(i, j, k) represent horizontal and vertical components of the motion vector V(i, j, k), respectively. An interframe predictive error signal E(i, j, k) is represented by Formula (4) hereunder:

$$E(i, j, k) = X(i, j, k) - X(i-1, j-vx(i, j, k), k-vy(i, j, k)) \quad (4)$$

In the motion-compensated interframe predictive coding method, the interframe predictive error signal E(i, j, k) and the motion vector V(i, j, k) are coded into a coded predictive error signal and a coded vector, respectively. In order to carry out a normal reproduction of the picture element X(i, j, k) by decoding the coded predictive error signal and the coded vector in a decoder, the picture element X(i, j, k) is obtained by Formula (5) hereunder which is given by modification of Formula (4):

$$X(i, j, k) = E(i, j, k) + X(i-1, j-vx(i, j, k), k-vy(i, j, k)) \quad (5)$$

In order to realize the normal reproduction by using Formula (5), the picture elements X(0, j, k) of the zeroth frame are given to the decoder. For this purpose, the picture elements X(0, j, k) of the zeroth picture are coded by using the intraframe coding.

Description will proceed to a reverse reproduction. In order to carry out the reverse reproduction of the picture elements X(i, j, k), the picture elements X(i, j, k) are successively decoded from the n-th frame to the zeroth frame by Formula (6) hereunder which is given by different modification of Formula (4):

$$X(i-1, j-vx(i, j, k), k-vy(i, j, k)) = -E(i, j, k) + X(i, j, k). \quad (6)$$

In order to carry out the reverse reproduction by using Formula (6), the picture elements X(n, j, k) of the n-th or trailing frame are given to the decoder. For this purpose, the picture elements X(n, j, k) of the n-th picture are coded by using intraframe coding.

However, the reverse reproduction can not be performed only by decoding the picture elements X(n, j, k) of the n-th picture by using the intraframe predictive coding. This incapability of the reverse reproduction will be described hereunder.

In FIG. 5, each frame of the digital video signal is represented by a one-dimensional signal like in FIG. 1. In FIG. 5, a motion vector of a j-th picture element of an i-th frame is represented by V(i, j) while an interframe predictive error signal (namely, the first result of the motion-compensated interframe predictive coding) of the j-th picture element of the i-th frame is represented by E(i, j). An intraframe coded signal (namely, the second result of the intraframe predictive coding) of the j-th picture element of the i-th frame is represented by P(i, j).

In order to perform the normal reproduction, all of the picture elements of the zeroth frame are subjected to the intraframe coding to produce the second results P(0, 1), P(0, 2), P(0, 3), and P(0, 4). All of the picture elements of the first frame are subjected to the motion-compensated interframe predictive coding to produce the first results E(1, 1), E(1, 2), E(1, 3), and E(1, 4) and the motion vectors V(1, 1), V(1, 2), V(1, 3) and V(1, 4).

First through third picture elements of the second frame are subjected to the motion-compensated interframe predictive coding to produce the first results E(2, 1), E(2, 2), and E(2, 3) and the motion vectors V(2, 1), V(2, 2), and V(2, 3). A fourth picture element of the second frame is subjected to the intraframe coding to produce the second result P(2, 4).

For the third and the fourth frames, all of the picture elements are subjected to the motion-compensated interframe predictive coding to produce the first result E(3, 1), E(3, 2), E(3, 3), E(3, 4), E(4, 1), E(4, 2), E(4, 3), and E(4, 4) and the motion vectors V(3, 1), V(3, 2), V(3, 3), V(3, 4), V(4, 1), V(4, 2), V(4, 3), and V(4, 4).

In order to perform the reverse reproduction, all of the picture elements of the trailing frame, namely, the fourth frame, are subjected to the intraframe coding to produce the second results P(4, 1), P(4, 2), P(4, 3), and P(4, 4).

Description will be made more in detail as regards the motion-compensated interframe coding of the first picture element of the second frame. The motion-compensated interframe predictive coding is carried out by detecting the motion vector V(2, 1) and by using the motion vector V(2, 1). The motion vector V(2, 1) represents a movement from the second picture element of the first frame to the first picture element of the second frame in FIG. 5. In other words, motion-compensated interframe coding of the first picture element of the second frame is carried out with reference to the second picture element of the first frame. The motion-compensated interframe coding of each of the second and the third picture elements of the third frame is carried out with reference to the third picture element of the second frame. Likewise, the motion-compensated interframe predictive coding of the first picture element of the first frame is carried out with reference to the first picture element of the zeroth frame.

Turning to FIG. 6, the first and the second results E and P and the motion vectors V are represented for use in carrying out the normal reproduction.

Turning back to FIG. 5, when the reverse reproduction is carried out in accordance with Formula (6), it is impossible to decode the first picture element of the first frame and the first picture element of the second frame for the reason which will be described hereunder. Attention will be directed to the first picture element of the first frame. The first picture element of the first frame has no relation to the movement represented by each of the motion vectors V(2, 1), V(2, 2), V(2, 3), and V(2, 4) which are used in carrying out the motion-compensated predictive coding on the picture elements of the second frame which follows the first frame. That is, the motion-compensated interframe predictive coding of the picture elements of the second frame is carried out without reference to the first picture element of the first frame.

Likewise, the first picture element of the second frame has no relation to the movement represented by each of the motion vectors V(3, 1), V(3, 2), V(3, 3), and V(3, 4) which are used in carrying out the motion-compensated predictive coding on the picture elements of the third frame.

This is the reason why the first picture element of the first frame and the first picture element of the second frame can not be decoded when the reverse reproduction is carried out.

In order to resolve this problem, the first picture element of the first frame and the first picture element of the second frame are subjected to the intraframe coding to produce the second results P(1, 1) and P(2, 1) in accordance with this invention. In FIG. 5, a symbol * is again attached to the right upper portion of each of the second results P(1, 1), P(2, 1), P(4, 1), P(4, 2), P(4, 3), and P(4, 4) which are used in carrying out the reverse reproduction and which are not used in carrying out the normal reproduction.

Turning to FIG. 7, the first and the second results E and P and the motion vectors V are represented for use in carrying out the reverse reproduction.

Turning back to FIG. 5 again, a method according to the second embodiment of this invention will be described in detail. The method comprises a producing step wherein production is made about a coding mode signal which indicates a selected one of the motion-compensated interframe predictive coding and the intraframe coding when the motion-compensated interframe/intraframe adaptive coding is used in the digital video signal. The motion-compensated interframe predictive coding is carried out by detecting a motion vector representative of a movement of each picture element between adjacent ones of successive pictures of the digital video signal. The intraframe coding is carried out by using a correlation between the picture elements within each of the successive pictures.

In a selectively coding step, the digital video signal is selectively coded into a first coded signal by carrying out the selected one of the motion-compensated interframe predictive coding and the intraframe coding in response to the coding mode signal. The first coded signal carries a first result E of the motion compensated interframe predictive coding and a second result P of the intraframe coding.

The selectively coding step is made to carry out the intraframe coding on a specific element (for example, the first picture element of the first frame) of the picture elements of a current picture (that is, the first frame) to produce a second coded signal P(1, 1) when the coding mode signal indicates that the specific element should be subjected to the motion-compensated interframe predictive coding and furthermore when the specific element has no relation to the movement represented by each of the motion vectors V(2, 1), V(2, 2), and V(2, 3). The motion vectors V(2, 1), V(2, 2), and V(2, 3) are used in carrying out the motion-compensated interframe predictive coding on the picture elements of a following frame (that is, the second frame) when the coding mode signal indicates that the picture elements of the following frame should be subjected to the motion-compensated interframe predictive coding. The following picture follows the current picture in the successive pictures.

When the second frame becomes the current picture, the specific element corresponds to the first picture element of the second frame. In this event, the selectively coding step produces the second result P(2, 1).

The first and the second coded signals, the motion vectors, and the coding mode signal are multiplexed into a multiplexed signal.

Description will be made as regards a method for detecting the specific element by the use of Formula (6). Supposing in Formula (6) that:

$$a = j - vx(i, j, k), \quad b = k - vy(i, j, k), \quad (7)$$

Formula (6) is modified into Formula (8) hereunder:

$$X(i=1, a, b) = -E(i, a+vx(i, j, k), b+vy(i, j, k)) + X(i, a+vx(i, j, k), b+vy(i, j, k)). \quad (8)$$

When first and second integers are given as a and b, respectively, judgment is made whether or not third and fourth integers are obtained as j and k, respectively, by using Formula (7). When a result of the judgement indicates that it is impossible to obtain the third and the fourth integers, it will be understood that the motion-compensated interframe predictive coding is carried out on the picture elements of the i-th frame with no reference to a picture element X(i−1, a, b). That is, the picture element X(i−1, a, b) is the specific element. Therefore, the intraframe coding is carried out on the picture element X(i−1, a, b).

Figure 8:
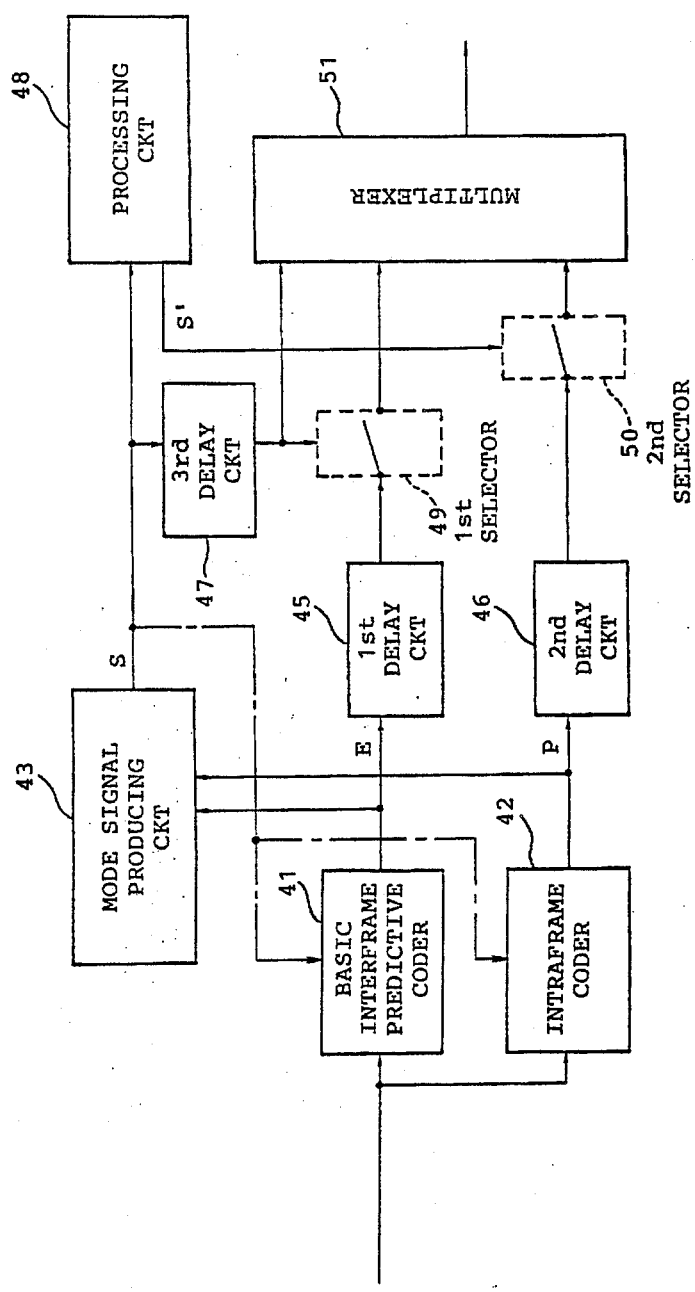
FIG. 8 is a block diagram of a coding device for use in carrying out the coding method according to the first embodiment of this invention.

Referring to FIG. 8, description will proceed to a coding device for use in carrying out the method according to the first embodiment of this invention. That is, the coding device is capable of carrying out the interframe/intraframe adaptive coding described above.

The coding device is for coding the digital video signal by subjecting the digital video signal to redundancy reduction coding. The decoding device comprises a basic interframe predictive coder 41 and an intraframe coder 42. Responsive to the digital video signal, the basic interframe predictive coder 41 carries out, as the redundancy reduction coding, the basic interframe predictive coding to produce an interframe predictive error signal E as a first result of the basic interframe predictive coding. Responsive to the digital video signal, the intraframe coder 42 carries out, as the redundancy reduction coding, the intraframe coding of, for example, intraframe predictive coding to produce an intraframe coded signal P as a second result of the intraframe coding.

Responsive to the first and the second result E and P, a mode signal producing circuit 43 produces a coding mode signal S which represents for each picture element a selected one of the basic interframe predictive coding and the intraframe coding in consideration of a first amount of produced information of the first result E and a second amount of produced information of the second result P. More specifically, the mode signal producing circuit 43 compares the first and the second amounts and produces a compared result signal. When the compared result signal represents that the first amount is smaller than the second amount, the mode signal producing circuit 43 produces the coding mode signal S which has a logic "0" level to represent the basic interframe predictive coding. When the compared result signal represents that the first amount is not smaller than the second amount, the mode signal producing circuit 43 produces the coding mode signal S which has a logic "1" level to represent the intraframe coding. Inasmuch as the mode signal producing circuit 43 is known in the art, details will no more be described.

When the coding mode signal S is used for the coders 41 and 42 in coding of a succeeding part of the digital video signal, the coding signal is supplied to the coders 41 and 42.

Responsive to the first result E, a first delay circuit 45 delays the first result E to produce a first delayed signal by providing a delay which is equal to a period of each frame or picture. Likewise, a second delay circuits 46 delays the second result P to produce a second delayed signal by providing the delay equal to the period of each frame. A third delay circuit 47 delays the coding mode signal S to produce a delayed mode signal by providing the delay equal to the period of each frame.

Responsive to the coding mode signal S, a processing circuit 48 processes the coding mode signal S into a processed mode signal S' which has a logic "1" level to represent the intraframe coding for picture elements which are necessary on carrying out the reverse reproduction and the normal reproduction. The above-mentioned particular elements are included in the picture elements.

Responsive to the first delayed signal and the delayed mode signal, a first selector 49 selects the first delayed signal as a first selected signal only when the delayed mode signal has a logic "0" level to represent the basic interframe predictive coding. Responsive to the second delayed signal and the processed mode signal, a second selector 50 selects the second delayed signal as a second selected signal only when the processed mode signal S' has a logic "1" level to represent the intraframe coding.

A multiplexer 51 multiplexes the first and the second selected signals and the delayed mode signal into the multiplexed signal.

Figure 9:
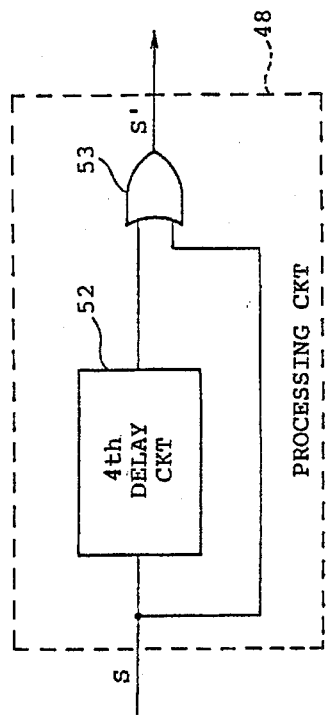
FIG. 9 is a block diagram of a processing circuit for use in the coding device illustrated in FIG. 8.

Referring to FIG. 9, the processing circuit 48 comprises a fourth delay circuit 52 and an OR gate 53. The fourth delay circuit 52 delays the coding mode signal S to produce another delayed mode signal by providing the delay equal to a period of each frame or picture. The other delayed mode signal is equivalent to the delayed mode signal produced by the third delay circuit 47 illustrated in FIG. 8. Responsive to the coding mode signal S and the other delayed signal, the OR gate 53 produces an OR'ed signal as the processed mode signal S'.

Reviewing FIGS. 8 and 9, the mode signal producing circuit 43 serves as a producing arrangement for producing the coding mode signal S which indicates a selected one of the basic interframe predictive coding and the intraframe coding. A combination of the interframe and the intraframe coders 41 and 42, the first through the third frame delay circuits 45 to 46, and the first and the second selectors 49 and 50 is operable as a selective coding arrangement. The selective coding arrangement selectively codes the digital video signal into a first coded signal by carrying out the selected one of the basic interframe predictive coding and the intraframe coding in response to the coding mode signal S. The first coded signal carries the first and the second results E and P.

The processing circuit 48 serves as a controlling arrangement. The controlling arrangement controls the selective coding arrangement to make the selective coding arrangement carry out the intraframe coding on a particular element of the picture elements of a current picture to produce a second coded signal when the coding mode signal S indicates that the particular element should be subjected to the basic interframe predictive coding and that a corresponding element of a following picture should be subjected to the intraframe coding. The following picture follows the current picture in the successive pictures. The corresponding element corresponds to the particular element. The multiplexer 51 serves as a multiplexing arrangement which multiplexes the first and the second coded signals and the coding mode signal S into a multiplexed signal.

Figure 10:
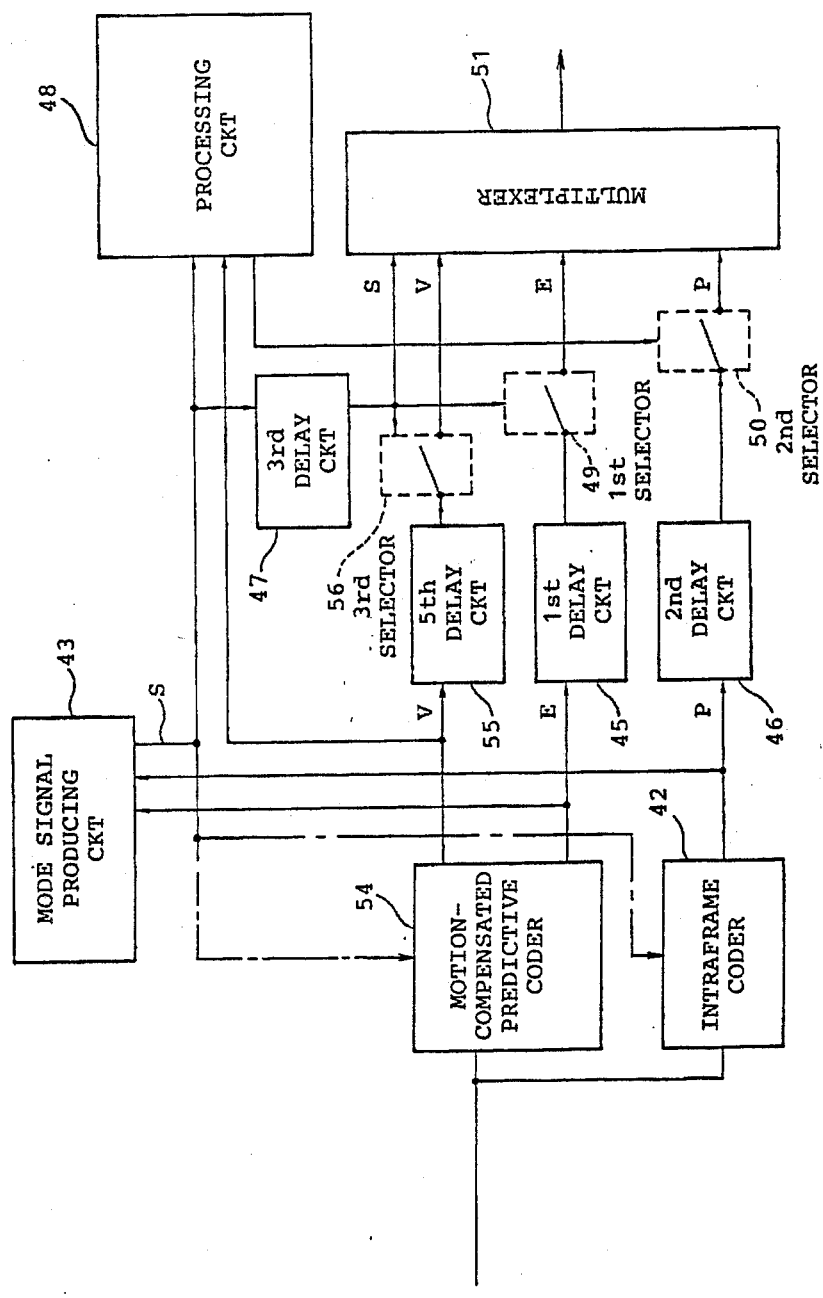
FIG. 10 is a block diagram of a coding device for use in carrying out the coding method according to the second embodiment of this invention.

Referring to FIG. 10, description will proceed to a coding device for use in carrying out the method according to the second embodiment of this invention. That is, the coding device is capable of carrying out the motion-compensated interframe predictive coding described above.

The coding device is similar to the coding device illustrated in FIG. 8 except for the following. A motion-compensated predictive coder 54 is used instead of the basic interframe predictive coder 41 illustrated in FIG. 8. The motion-compensated predictive coder 54 carries out the motion-compensated interframe predictive coding to produce an interframe predictive error signal E as a first result of the motion-compensated interframe predictive coding. In this event, the motion-compensated predictive coder 54 also produces a motion vector V described above. The mode signal producing circuit 43 produces a coding mode signal S which represents for each picture element a selected one of the motion-compensated interframe predictive coding and the intraframe predictive coding in consideration of a first amount of produced information of the first result E and a second amount of produced information of the second result P.

Each of the first, the second, and the third delay circuits 45, 46, and 47 provides a delay which is equal to twice a period of each frame or picture. A fifth delay circuit 55 delays the motion vector V to produce a delayed vector V by providing a delay which is equal to twice a period of each frame.

As will presently be described, the processing circuit 48 processes the coding mode signal S into a processed mode signal S' with reference to the motion vector V.

Responsive to the delayed vector and the delayed mode signal produced by the third delay circuit 47, a third selector 56 selects the delayed vector V as a selected vector only when the delayed mode signal represents the motion-compensated interframe predictive coding. Only when the delayed mode signal represents the motion-compensated interframe predictive coding, the first selector 49 selects an output signal of the first delay circuit 45, namely, the first delayed signal, as the first selected signal.

The multiplexer 51 multiplexes the delayed vector, the delayed mode signal, and output signals of the first and the second selectors 49 and 50, namely, the first and the second selected signals, into the multiplexed signal.

Figure 11:
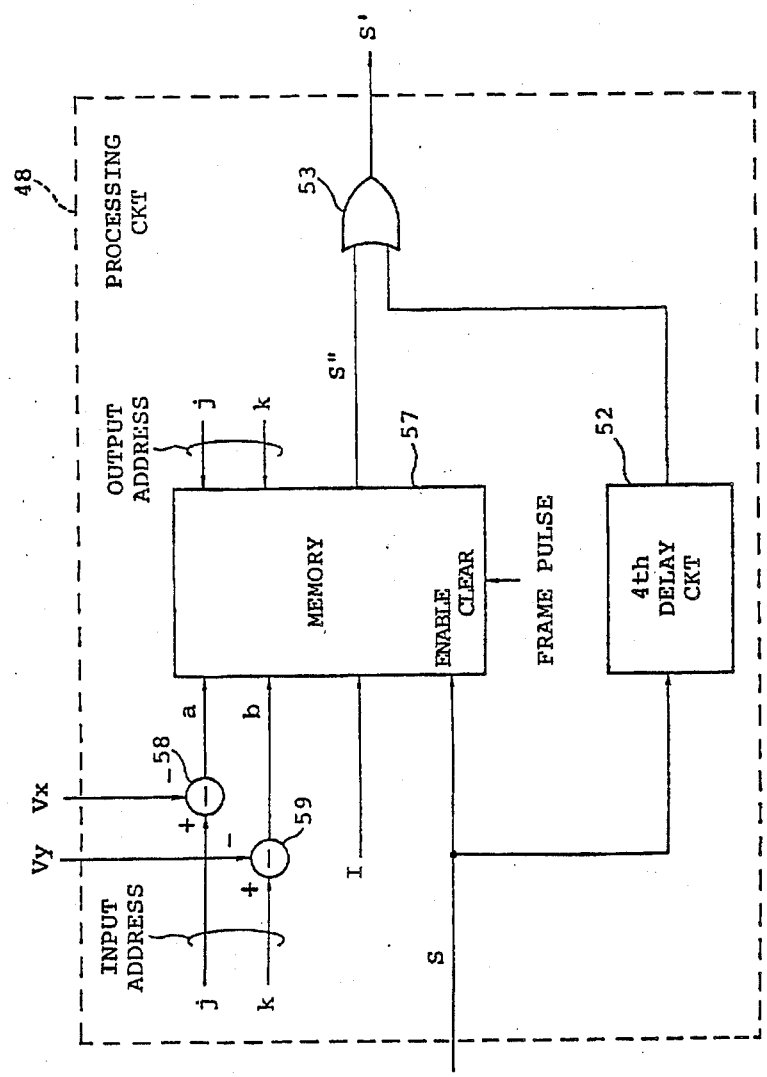
FIG. 11 is a block diagram of a processing circuit for use in the coding device illustrated in FIG. 10.

Turning to FIG. 11, the processing circuit 48 of the coding device illustrated in FIG. 10 is similar to that illustrated in FIG. 9 except for the following. The fourth delay circuit 52 delays the coding mode signal S to produce the delayed mode signal by providing a delay equal to twice a period of each frame or picture. The delayed mode signal is a normal mode signal which is used in carrying out the normal reproduction. A combination of a memory 57 and subtractors 58 and 59 receives the coding mode signal S and the horizontal and vertical components Vx and Vy of the motion vector V to produce a reverse mode signal S'' which is for use in carrying out the reverse reproduction. More specifically, the reverse mode signal S'' has a logic "1" level so as to represent the intraframe coding for picture elements which are necessary on carrying out the reverse reproduction. The above-mentioned specific elements are included in the picture elements. Supplied with the normal mode signal and the reverse mode signal S'', the OR gate 53 produces an OR'ed signal as the processed mode signal S'.

Description is now made as regards the combination of the memory 57 and subtractors 58 and 59 in detail. It will be assumed that a picture element address corresponding to a picture element location of the motion vector V is represented by i, j. The subtractor 58 subtracts the horizontal component Vx from a horizontal component j of the picture element address to produce a first subtraction result a of the subtraction. The subtractor 59 subtracts the vertical component Vy from a vertical component k of the picture element address k to produce a second subtraction result b of the subtraction.

Supplied with a memory address of the memory 57 that is indicated by the first and the second subtraction results a and b, the memory 57 memorizes an input signal I in the memory address as a memorized signal only when the coding mode signal S indicates the motion-compensated interframe predictive coding. For this purpose, the coding mode signal S is supplied to an enable terminal of the memory 57. As a result, the input signal I is never memorized in the memory 57 when the coding mode signal S indicates the intraframe coding. The input signal I indicates the motion-compensated interframe predictive coding mode and is of, for example, a logic "0" level. After a lapse of a period of each frame or picture, the memorized signal is read out of the memory 57 as the reverse mode signal S'' in response to an output address supplied to the memory 57.

After the reverse mode signal S'' is read out of the memory 57, another input signal (not shown) representative of the intraframe coding must be memorized in the memory 57 as another memorized signal in order to produce a following reverse mode signal S''. The other input signal is, for example, a logic "1" level. For this purpose, a content of the memory 57 is erased when the memory 57 receives a frame pulse which is generated in synchronism with a leading part of each frame. The following reverse mode signal S'' has a logic "1" level to represent the intraframe coding even for the above-mentioned specific elements which are detected in the manner described in conjunction with Formulas (7) and (8).

Reviewing FIGS. 10 and 11, the mode signal producing circuit 43 serves as another producing arrangement for producing the coding mode signal S which indicates a selected one of the motion-compensated interframe predictive coding and the intraframe coding. A combination of the motion-compensated predictive coder 54, the intraframe coder 42, the first through third delay circuits 45 to 47, the fifth delay circuit 55, and the first, the second, and the third selectors 49, 50, and 56 is operable as another selective coding arrangement. The selective coding arrangement selectively codes the digital video signal into a first coded signal by carrying out the selected one of the motion-compensated interframe predictive coding and the intraframe coding in response to the coding mode signal S. The first coded signal carries the first and the second results E and P.

The processing circuit 48 serves as another controlling arrangement. The controlling arrangement controls the other selective coding arrangement carry out the motion-compensated interframe predictive coding on a specific element of the picture elements of a current picture to produce a second coded signal when the coding mode signal S indicates that the specific element should be subjected to the motion-compensated interframe predictive coding and furthermore when the specific element has no relation to the movement represented by each of the motion vectors V which are used in carrying out the motion-compensated interframe predictive coding on the picture elements of a following frame when the coding mode signal indicates that the picture elements of the following frame should be subjected to the motion-compensated interframe predictive coding. The following picture follows the current picture in the successive pictures.

The multiplexer 51 serves as another multiplexing arrangement which multiplexes the first and the second coded signals, the motion vectors V, and the coding mode signal S into a multiplexed signal.

Figure 12:
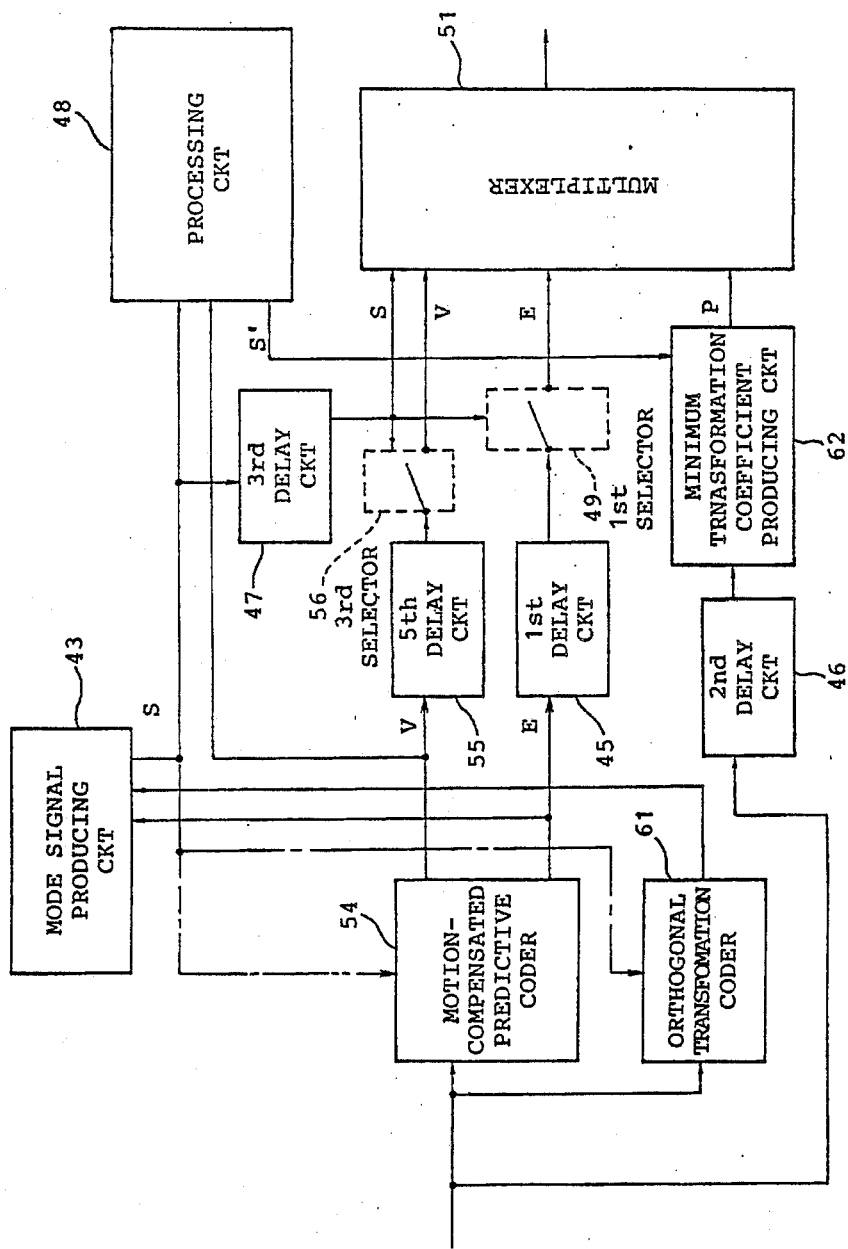
FIG. 12 is a block diagram of another coding device for use in carrying out the coding method according to the second embodiment of this invention.

Referring to FIG. 12, description will proceed to another coding device for use in carrying out the method according to the second embodiment of this invention. In the coding device, orthogonal transformation coding is used as the intraframe coding.

The coding device is similar to that illustrated in FIG. 10 except that an orthogonal transformation coder 61 and a minimum transformation coefficient producing circuit 62 are used instead of the intraframe coder 42 and the second selector 50, respectively, and that the second delay circuit 46 is supplied with the digital video signal.

Responsive to the digital video signal, the orthogonal transformation coder 61 carries out orthogonal transformation coding of the digital video signal to produce an orthogonal transformation coded signal as a result of the orthogonal transformation coding. The result of the orthogonal transformation coding is supplied only to the mode signal producing circuit 43. The second delay circuit 46 delays the digital video signal to produce a delayed video signal by providing a delay which is equal to twice a period of each frame.

Responsive to the processed mode signal S', the minimum transformation coefficient producing circuit 62 selects the delayed video signal as a selected video signal only when the processed mode signal S' has a logic "1" level to represent the orthogonal transformation coding. Thereafter, the minimum transformation coefficient producing circuit 62 carries out orthogonal transformation coding on the selected video signal to produce another orthogonal transformation coded signal as the second result P of the orthogonal transformation coding.

In this event, the minimum, transformation coefficient producing circuit 62 carries out the orthogonal transformation coding by using a minimum transformation coefficient which is determined on the basis of linear programming so that an amount of produced information of the second result P becomes minimum. The second result P of the orthogonal transformation coding is directly supplied to the multiplexer 51.

In the decoding device illustrated in FIG. 12, a combination of the motion-compensated coder 54, the orthogonal transformation coder 61, the first through the third delay circuits 45 to 47, the fifth delay circuit 55, the first and the third selectors 49 and 56, and the minimum transformation coefficient producing circuit 62 is operable as still another selective coding arrangement. The selective coding arrangement selectively codes the digital video signal into the first coded signal by carrying out the selected one of the motion-compensated interframe predictive coding and the intraframe coding (that is, the orthogonal transformation coding) in response to the coding mode signal S. The first coded signal carries the first and the second results E and P.

Figure 13:
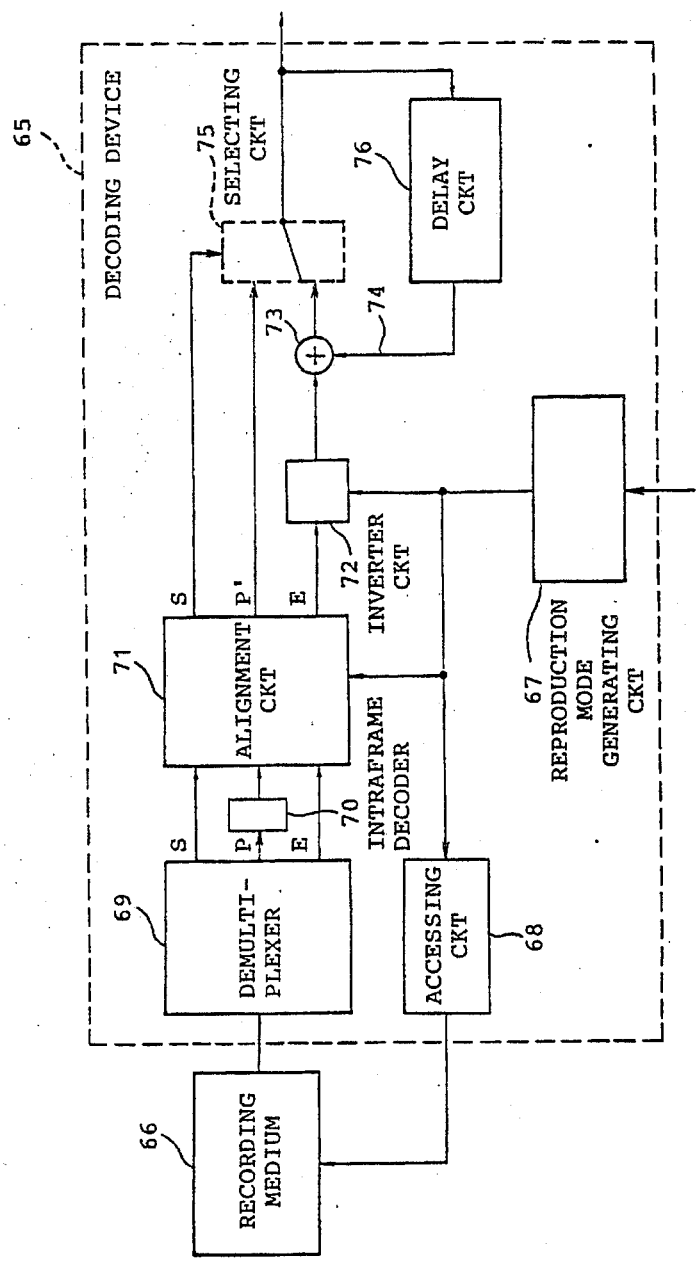
FIG. 13 shows, in blocks and together with a recording medium, a decoding device for decoding a read-out signal read out of the recording medium on which an output signal of the coding device illustrated in FIG. 8 is recorded.

Referring to FIG. 13, a decoding device 65 is for use in combination with a recording medium 66. The decoding device 65 is for decoding a read-out signal read out of the recording medium 66 on which an output signal of the coding device illustrated in FIG. 8 is successively recorded. The output signal of the coding device illustrated in FIG. 8 is equivalent with the multiplexed signal produced by the coding device illustrated in FIG. 8. The multiplexed signal is successively recorded on the recording medium 66 from a leading part of the multiplexed signal to a trailing part of the multiplexed signal in a normal order. The leading part corresponds to a leading one of the picture elements of the leading picture or frame of the digital video signal while the trailing part corresponds to a trailing one of the picture elements of the trailing picture or frame of the digital video signal.

The decoding device 65 comprises a reproduction mode signal generating circuit for generating a reproduction mode signal which indicates a selected one of a normal reproduction and a reverse reproduction in response to a request issued by an operator or user. Responsive to the reproduction mode signal, an accessing circuit 68 accesses the recording medium 66 so that the multiplexed signal is read out of the recording medium 66 in the normal order when the reproduction mode signal indicates the normal reproduction. When the reproduction mode signal indicates the reverse reproduction, the multiplexed signal is read out of the recording medium 66 in a reverse order relative to the normal order by the accessing circuit 68.

Responsive to the multiplexed signal, a demultiplexer 69 demultiplexes the multiplexed signal into the interframe predictive error signal (namely, the first result of the basic predictive coding) E, the intraframe coded signal (namely, the second result of the intraframe coding) P, and the coding mode signal S. An intraframe decoder 70 decodes the intraframe coded signal P into an intraframe decoded signal P'.

Responsive to the reproduction mode signal, an alignment circuit 71 aligns each of the interframe predictive error signal E and the coding mode signal S with the intraframe decoded signal P' only when the reproduction mode signal indicates the reverse reproduction. In this event, the alignment circuit 71 delays each of the interframe predictive error signal E and the coding mode signal S by a delay equal to a period of each picture or frame to produce a delayed predictive error signal and a delayed mode signal. When the reproduction mode signal indicates the reverse reproduction, the alignment circuit 71 produces the intraframe decoded signal P' as it is. When the reproduction mode signal indicates the normal reproduction, the alignment circuit 71 produces each of the interframe predictive error signal E, the coding mode signal S, and the intraframe decoded signal P' as it is.

Responsive to the reproduction mode signal which indicates the reverse reproduction, an inverter circuit 72 inverts the delayed predictive error signal to produce an inverted predictive error signal as an output signal thereof. When the reproduction mode signal indicates the normal reproduction, the inverter circuit 72 produces, as the output signal thereof, the interframe predictive error signal E as it is. An adder 73 adds the output signal of the inverter circuit 72 and a prediction signal 74 to produce an interframe predictive decoded signal.

A selecting circuit 75 receives the coding mode signal S from the alignment circuit 71 as a received mode signal when the decoding device 65 carries out the normal reproduction. When the decoding device 65 carries out the reverse reproduction, the selecting circuit 75 receives the delayed mode signal from the alignment circuit 71 as the received mode signal. When the received mode signal indicates the intraframe coding, the selecting circuit 75 selects the intraframe decoded signal P' as a selected intraframe decoded signal. When the received mode signal indicates the basic interframe predictive coding, the selecting circuit 75 selects the interframe predictive decoded signal as a selected interframe predictive decoded signal. Thus, the selecting circuit 75 produces the selected intraframe decoded signal and the selected interframe predictive decoded signal collectively as a decoded video signal of a digital form.

The decoded video signal is delivered to an external device for reproduction of pictures. The decoded video signal is also delivered to a delay circuit 76. The delay circuit 76 delays the decoded video signal by a delay which is equal to a period of each picture or frame. The delay circuit 76 thereby produces a delayed video signal as the prediction signal 74.

The decoding device 65 carries out the normal reproduction of the picture elements of the pictures of the digital video signal in accordance with Formula (2) described above while the decoding device 65 carries out the reverse reproduction of the pictures of the digital video signal in accordance with Formula (3).

Figure 14:
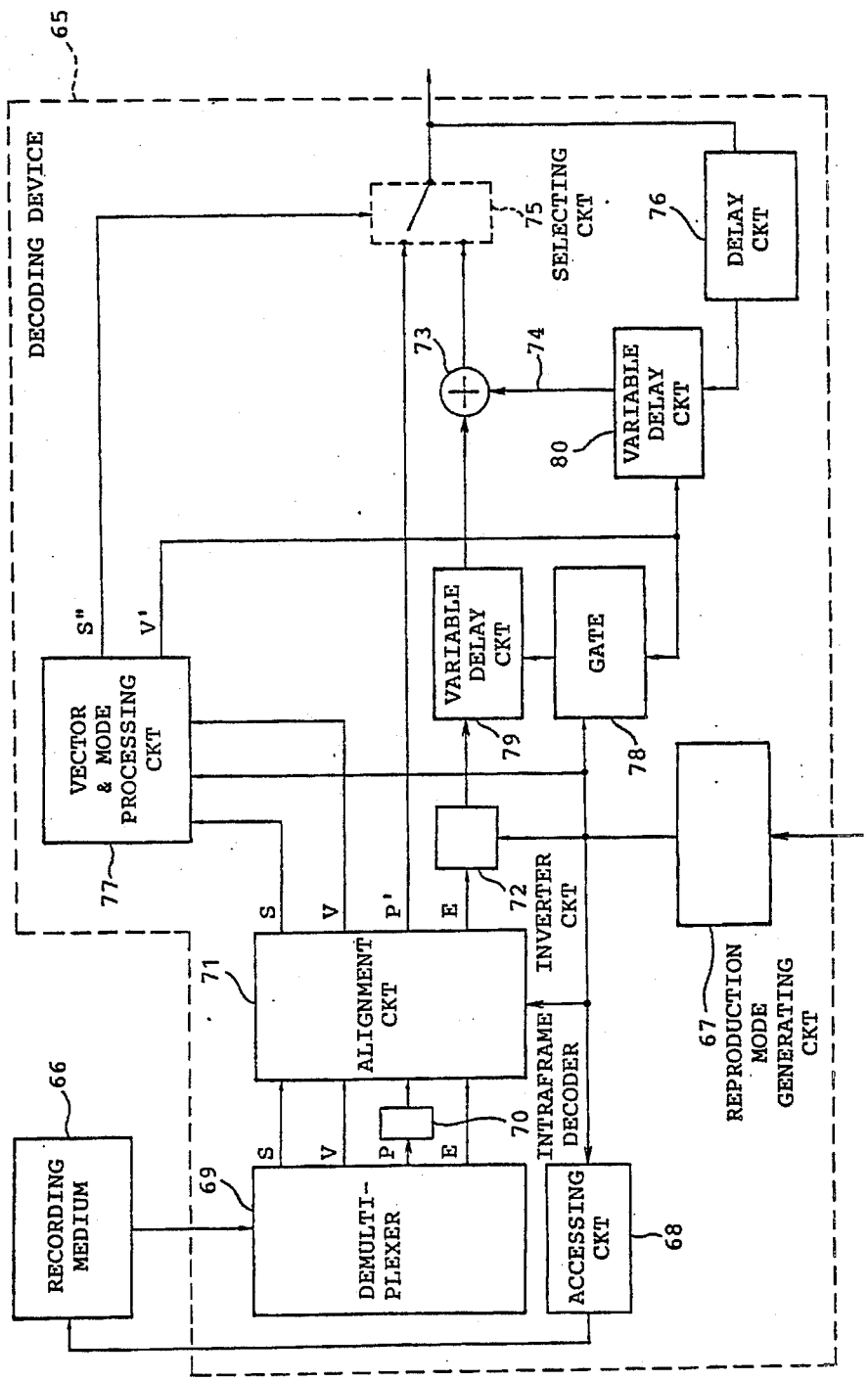
FIG. 14 shows, in blocks and together with a recording medium, a decoding device for decoding a read-out signal read out of the recording medium on which an output signal of the coding device illustrated in FIG. 10 is recorded.

Referring to FIG. 14, a decoding device 65 is for decoding a read-out signal read out of a recording medium 66 on which an output signal (that is, the multiplexed signal) of the coding device illustrated in FIG. 10 is successively recorded. The decoding device 65 is similar to that illustrated in FIG. 13 except for the following. The multiplexed signal further comprises the motion vectors V. The demultiplexer 69 demultiplexes the multiplexed signal into the interframe predictive error signal E, the motion vector V, intraframe coded signal P, and the coding mode signal S.

The alignment circuit 71 aligns only the interframe predictive error signal E with the intraframe decoded signal P' only when the reproduction mode signal indicates the reverse reproduction. In this event, the alignment circuit 71 delays only the motion-compensated interframe predictive error signal E by a delay equal to a period of each picture or frame to produce a delayed predictive error signal. The alignment circuit 71 produces the motion vectors V as it stands regardless of the reproduction mode signal.

A vector & mode processing circuit 77 receives the motion vector V and the coding mode signal S. When the reproduction mode signal indicates the reverse reproduction, the vector & mode processing circuit 77 processes the motion vector V into a reverse mode vector V' and further processes the coding mode signal S into the reverse mode signal S" described above. The reverse mode vector V' will later be described. When the reproduction mode signal indicates the normal reproduction, the vector & mode processing circuit 77 produces each of the motion vector V and the coding mode signal S as it is. Either the reverse mode signal S" or the coding mode signal S is delivered to the selecting circuit 75.

Responsive to the reproduction mode signal which indicates the reverse reproduction, a gate 78 receives the reverse mode vector V' to deliver the reverse mode vector V' to a variable delay circuit 79. When the reproduction mode signal indicates the normal reproduction, the gate 78 inhibits delivering the motion vector V to the variable delay circuit 79. The variable delay circuit 79 delays the inverted predictive error signal by a variable delay which is varied in accordance with the movement represented by the reverse mode vector V'. An output signal of the variable delay circuit 79 is delivered to the adder 73. When the variable delay circuit 79 receives no motion vector, the variable delay circuit 79 supplies the interframe predictive error signal E to the adder 73 as it is.

Another variable delay circuit 80 delays an output signal of the delay circuit 76 by a variable delay which is varied in accordance with the movement of the motion vector received from the vector and mode processing circuit 77. The variable delay circuit 80 thereby produces a delayed signal as the predictive signal 74.

The decoding device 65 carries out the normal reproduction of the picture elements of the pictures of the digital video signal in accordance with Formula (5) described above while the decoding device 65 carries out the reverse reproduction of the pictures of the digital video signal in accordance with Formula (6).

Figure 15:
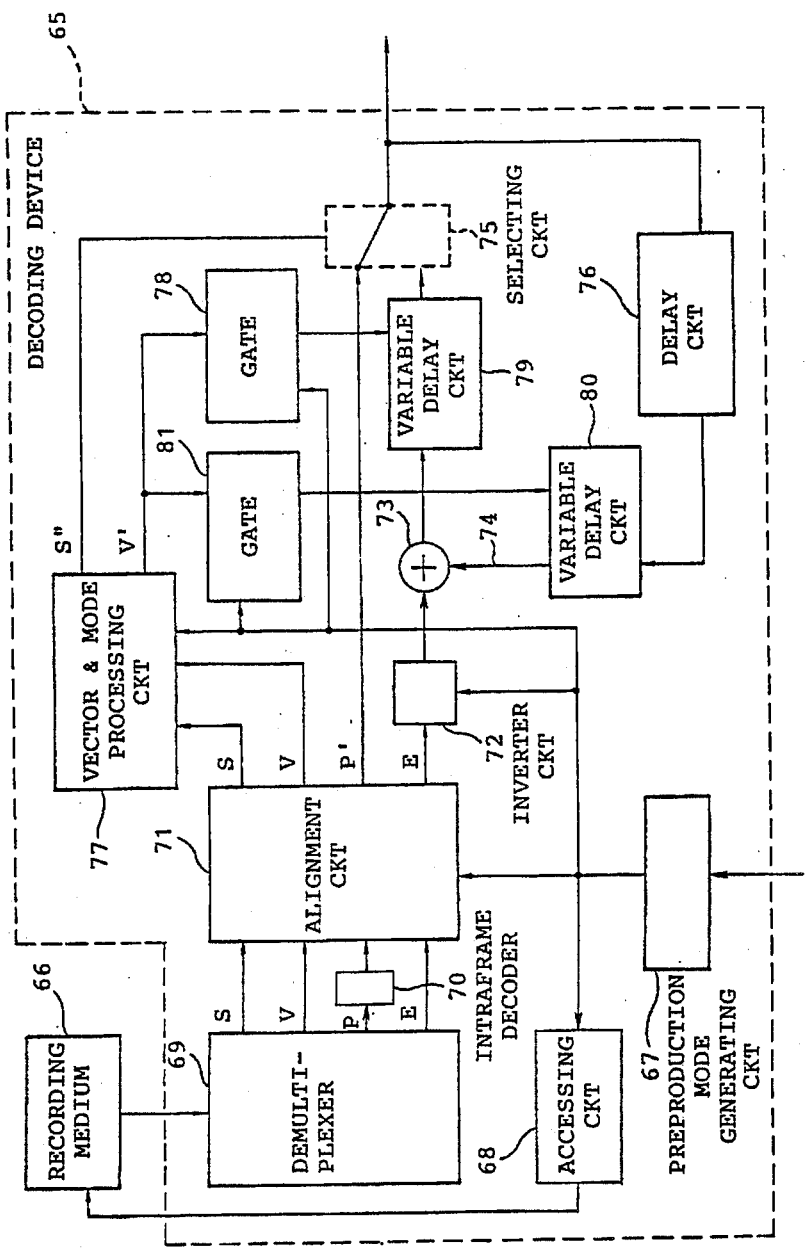
FIG. 15 shows, in blocks and together with a recording medium, another decoding device for decoding a read-out signal read out of the recording medium on which an output signal of the coding device illustrated in FIG. 8 is recorded.

Turning to FIG. 15, a decoding device 65 is also for decoding a read-out signal read out of a recording medium 66 on which an output signal of the coding device illustrated in FIG. 10 is successively recorded. The decoding device 65 is similar to that illustrated in FIG. 14 except for the following The variable delay circuit 79 is connected between the adder 73 and the selecting circuit 75. The inverter circuit 72 is directly connected to the adder 73. As a result, the interframe predictive decoded signal is delayed by the variable delay circuit 79 by a variable delay which is varied in accordance with the reverse mode vector V'.

Another gate 81 is connected between the vector & mode processing circuit 77 and the other variable delay circuit 80. Responsive to the reproduction mode signal which indicates the normal reproduction, the other gate 81 receives the motion vector V to deliver the motion vector V to the variable delay circuit 80. When the reproduction mode signal indicates the reverse reproduction, the gate 80 inhibits delivering the reverse motion vector V' to the variable delay circuit 80.

Figure 16:
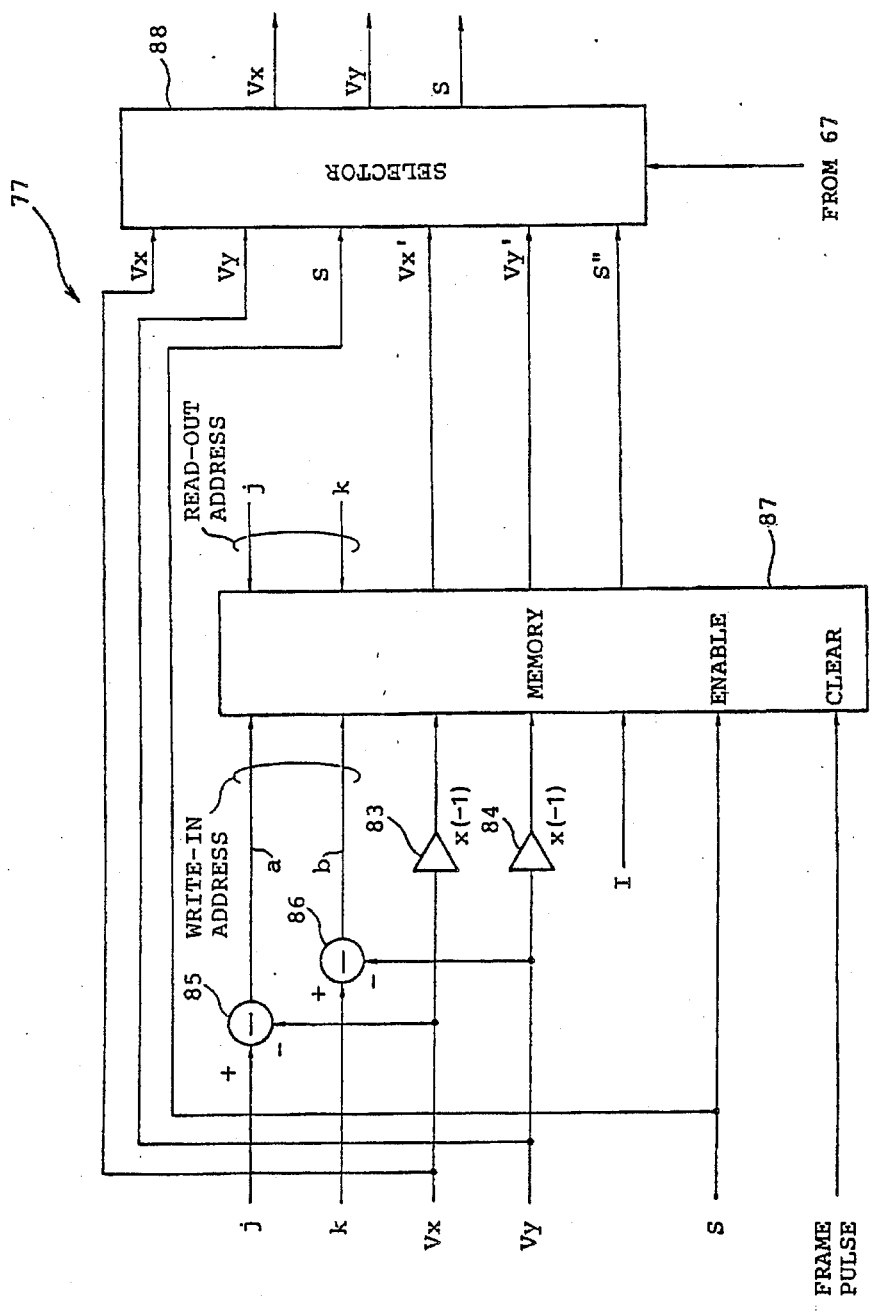
FIG. 16 is a block diagram of a vector & mode processing circuit for use in each of the decoding device illustrated in FIGS. 14 and 15.

Turning to FIG. 16, the vector & mode processing circuit 77 comprises first and second multipliers 83 and 84. The first multiplier 83 multiplies a horizontal component Vx by −1 to produce a first multiplication result of multiplication. Likewise, the second multiplier 84 multiplies a vertical component Vy by −1 to produce a second multiplication result of multiplication. That is, the first and the second multiplication results are identical with first and second inverted components which are obtained by inverting the horizontal and the vertical components Vx and Vy, respectively.

It will be assumed that a picture element address corresponding to a picture element location of the motion vector V is represented by i, j. A first subtractor 85 subtracts the horizontal component Vx of the motion vector V from a horizontal component j of the picture element address to produce a first subtraction result a of the subtraction. A second subtractor 86 subtracts the vertical component Vy from a vertical component k of the picture element address to produce a second subtraction result b of the subtraction.

Supplied with a memory address which is indicated by the first and the second subtraction results a and b, a memory 87 memorizes the first and the second inverted components in the memory address. Simultaneously, an input signal I is memorized in the memory 87 in order to produce the reverse mode signal S". The input signal I indicates the motion-compensated interframe predictive coding mode and is of, for example, a logic "0" level.

When the coding mode signal S indicates the intraframe coding, the first and the second inverted components and the input signal I must not be memorized in the memory 87. For this purpose, the coding mode signal S is supplied to an enable terminal of the memory 87. As a result, the first and the second inverted components and the input signal I are never memorized in the memory 87 when the coding mode signal S indicates the intraframe coding.

After a lapse of a period of each frame or picture, the first and the second inverted components and the input signal I are read out of the memory 57 as the reverse mode vector V' (Vx, Vy) and the reverse mode signal S" in response to a read-out address supplied to the memory 87.

After the reverse mode signal S" is read out of the memory 87, another input signal (not shown) representative of the intraframe coding must be memorized in the memory 87 in order to produce a following reverse mode signal S". The other input signal is, for example, a logic "1" level to represent the intraframe coding. For this purpose, a content of the memory 57 is erased when the memory 57 receives a frame pulse which is generated in synchronism with a leading part of each frame.

The reverse mode vector V' (Vx, Vy) and the reverse mode signal S" are delivered to a selector 88. When the selector 88 receives from the reproduction mode generating circuit 67 the reproduction mode signal which indicates the normal reproduction, the selector 88 selects the coding mode signal S and the motion vector V to deliver the coding mode signal S and the motion vector V to external circuits. When the reproduction mode signal indicates the reverse reproduction, the selector 88 selects the reverse mode vector V' (Vx', Vy') and the reverse mode signal S" to deliver the reverse mode vector V' (Vx', Vy') and the reverse mode signal S" to the external circuits.

Figure 17:
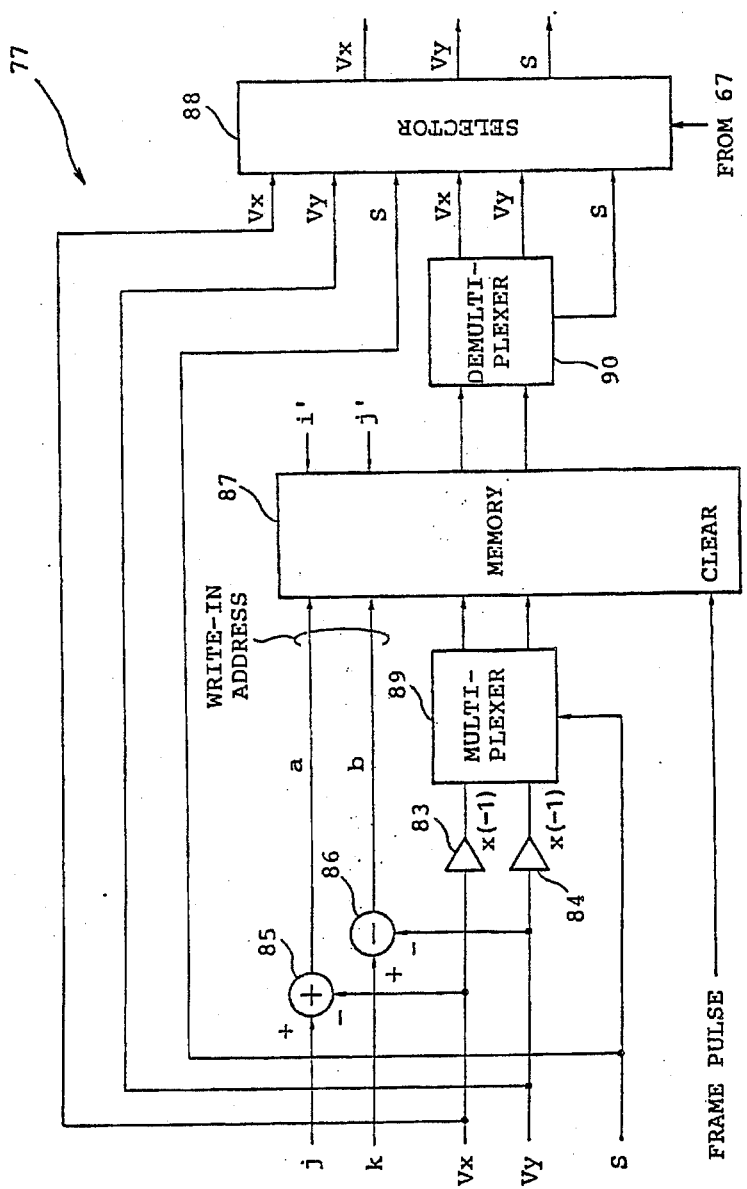
FIG. 17 is a block diagram of another vector & mode processing circuit for use in each of the decoding devices illustrated in FIGS. 14 and 15.

Turning to FIG. 17, the vector & mode processing circuit 77 is similar t that illustrated in FIG. 16 except that a multiplexer 89 is connected between the memory 87 and a pair of multipliers 83 and 84 and a demultiplexer 90 is connected between the memory 87 and the selector 88.

Responsive to the motion vector V (Vx, Vy), a pair of the multipliers 83 and 84 produces an inverted motion vector. The multiplexer 89 multiplexes the inverted motion vector and the coding mode signal S into a multiplexed signal. The multiplexed signal is memorized in the memory 87.

The multiplexed signal is read out of the memory 87 as a read-out signal. The demultiplexer 90 demultiplexes the read-out signal into the motion vector V (Vx, Vy) and the coding mode signal S. The motion vector V (Vx, Vy) and the coding mode signal S is delivered to the selector 90.

On multiplexing the inverted motion vector and the coding mode signal S, use is made of the fact that no motion vector is present or produced for an intraframe mode. A motion vector which is not existent in fact is used as the coding mode signal which indicates the intraframe mode. Supposing that the motion vectors are restricted to a predetermined area of (+15, +15), an exceptional motion vector of (−16, −16) is used as the coding mode signal which indicates the intraframe mode. The exceptional motion vector is treated as a specific example of the motion vectors. After the signals are read out of the memory 87, it is necessary to update the memory 87 so as to have the exceptional motion vector of (−16, −16) whenever the memory 87 is supplied with the frame pulse.

What is claimed is:

1. A method of coding a digital video signal by subjecting said digital video signal to redundancy reduction coding, said digital video signal being representative of successive pictures, each comprising a predetermined number of picture elements, said method comprising the steps of:

producing a coding mode signal which indicates, as said redundancy reduction coding, a selected one of interframe coding and intraframe coding which are carried out with reference to a first correlation factor between adjacent ones of said successive pictures and a second correlation factor between the picture elements within each of said successive pictures, respectively;

selectively coding said digital video signal into a first coded signal by carrying out said selected one of the interframe and the intraframe coding in response to said coding mode signal, said first coded signal carrying a first result of said interframe coding and a second result of said intraframe coding;

making said selectively coding step carry out said intraframe coding on a particular element of the picture elements of a current picture to produce a second coded signal when said coding mode signal indicates that said particular element should be subjected to said interframe coding and that a corresponding element of a following picture should be subjected to said intraframe coding, said following picture following said current picture in said successive pictures, said corresponding element corresponding to said particular element; and multiplexing said first and said second coded signals and said coding mode signal into a multiplexed signal.

2. A method of coding a digital video signal by subjecting said digital video signal to redundancy reduction coding, said digital video signal being representative of successive pictures, each comprising a predetermined number of picture elements, said method comprising the steps of:

producing a coding mode signal which indicates, as said redundancy reduction coding, a selected one of interframe coding and intraframe coding, said interframe coding being carried out by detecting a motion vector representative of a movement of each picture element between adjacent ones of said successive pictures and by using said motion vector, said intraframe coding being carried out by using a correlation between the picture elements within each of said successive pictures;

selectively coding said digital video signal into a first coded signal by carrying out said selected one of the interframe and the intraframe coding in response to said coding mode signal, said first coded signal carrying a first result of said interframe coding and a second result of said intraframe coding;

making said selectively coding step carry out said intraframe coding on a specific element of the picture elements of a current picture to produce a second coded signal when said coding mode signal indicates that said specific element should be subjected to said interframe coding and furthermore when said specific element has no relation to the movement represented by each of the motion vectors which are used in carrying out said interframe coding on the picture elements of a following frame when said coding mode signal indicates that the picture elements of said following frame should be subjected to said interframe coding, said following picture following said current picture in said successive pictures; and multiplexing said first and said second coded signals, said motion vectors, and said coding mode signal into a multiplexed signal.

3. A coding device for coding a digital video signal by subjecting said digital video signal to redundancy reduction coding, said digital video signal being representative of successive pictures, each comprising a predetermined number of successive picture elements, said coding device comprising:

producing means for producing a coding mode signal which indicates, as said redundancy reduction coding, a selected one of interframe coding and intraframe coding which are carried out with reference to a first correlation factor between adjacent ones of said successive pictures and a second correlation factor between the picture elements within each of said successive pictures, respectively;

selective coding means for selectively coding said digital video signal into a first coded signal by carrying out said selected one of the interframe and the intraframe coding in response to said coding mode signal, said first coded signal carrying a first result of said interframe coding and a second result of said intraframe coding;

controlling means for controlling said selective coding means to make said selective coding means carry out said intraframe coding on a particular element of the picture elements of a current picture to produce a second coded signal when said coding mode signal indicates that said particular element should be subjected to said interframe coding and that a corresponding element of a following picture should be subjected to said intraframe coding, said following picture following said current picture in said successive pictures, said corresponding element corresponding to said particular element; and multiplexing means for multiplexing said first and said second coded signals and said coding mode signal into a multiplexed signal.

4. A coding device for coding a digital video signal by subjecting said digital video signal to redundancy reduction coding, said digital video signal being representative of successive pictures, each comprising a predetermined number of picture elements, said coding device comprising:

producing means for producing a coding mode signal which indicates, as said redundancy reduction coding, a selected one of interframe coding and intraframe coding, said interframe coding being carried out by detecting a motion vector representative of a movement of each picture element between adjacent ones of said successive pictures and by using said motion vector, said intraframe coding being carried out by using a correlation between the picture elements within each of said successive pictures;

selective coding means for selectively coding said digital video signal into a first coded signal by carrying out said selected one of the interframe and the intraframe coding in response to said coding mode signal, said first coded signal carrying a first result of said interframe coding and a second result of said intraframe coding;

controlling means for controlling said selective coding means to make said selective coding means carry out said intraframe coding on a specific element of the picture elements of a current picture to produce a second coded signal when said coding mode signal indicates that said specific element should be subjected to said interframe coding and furthermore when said specific element has no relation to the movement represented by each of the motion vectors which are used in carrying out said interframe coding on the picture elements of a following frame when said coding mode signal indicates that the picture elements of said following frame should be subjected to said interframe coding, said following picture following said current picture in said successive pictures; and multiplexing means for multiplexing said first and said second coded signals, said motion vectors, and said coding mode signal into a multiplexed signal.

* * * * *